Feb. 24, 1970  P. E. SCHMID ET AL  3,497,716
TWO AMPLIFIER CIRCUIT FOR DETECTING SINE AND COSINE PULSES
Filed Sept. 28, 1967  3 Sheets-Sheet 1

INVENTORS
PIERRE E. SCHMID
DAVID J. NOWAK

BY *Arthur H. Seidel*

ATTORNEY

Feb. 24, 1970   P. E. SCHMID ET AL   3,497,716
TWO AMPLIFIER CIRCUIT FOR DETECTING SINE AND COSINE PULSES
Filed Sept. 28, 1967   *Fig.3*   3 Sheets-Sheet 2
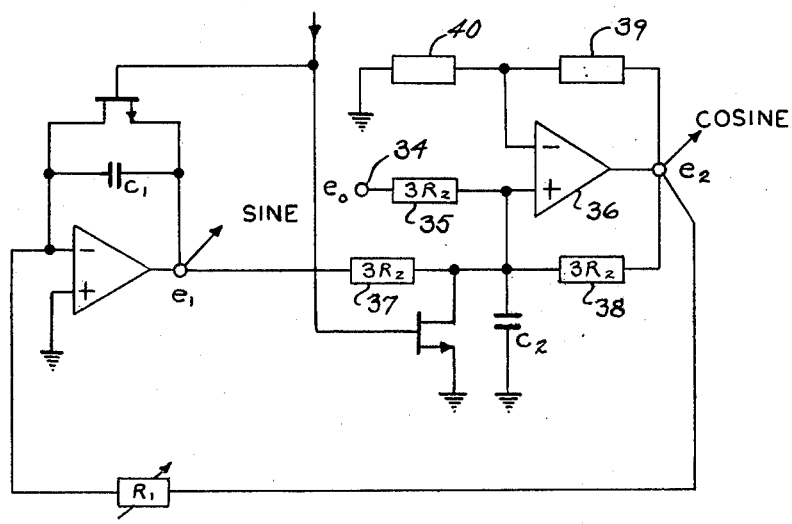
INPUT $e_0 = + \sin 2\pi (12f) t$
*Fig.4*
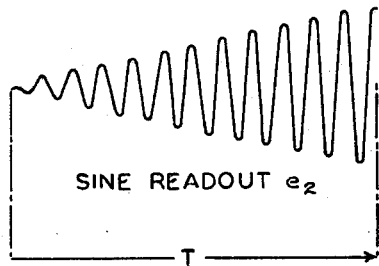
SINE READOUT $e_2$
INPUT $e_0 = +\sin 2\pi (12f) t$
*Fig.5*
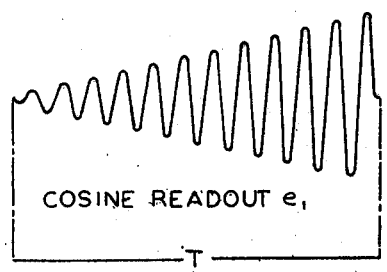
COSINE READOUT $e_1$
INVENTORS
PIERRE E. SCHMID
DAVID J. NOWAK
BY Arthur H. Seidel
ATTORNEY INPUT $e_o = + \cos 2\pi (12f)t$ SINE READOUT $e_2$ INPUT $e_o = + \cos 2\pi (12f)t$ COSINE READOUT $e_1$ INPUT $e_o = + \sin 2\pi (13f)t$ SINE READOUT $e_2$ INPUT $e_o = + \sin 2\pi (14f)t$ COSINE READOUT $e_1$

INVENTORS
PIERRE E. SCHMID
DAVID J. NOWAK

BY

ATTORNEY

United States Patent Office 3,497,716
Patented Feb. 24, 1970

3,497,716
TWO AMPLIFIER CIRCUIT FOR DETECTING SINE AND COSINE PULSES
Pierre E. Schmid, Whitefish Bay, and David J. Nowak, West Allis, Wis., assignors to Allen-Bradley Company, Milwaukee, Wis., a corporation of Wisconsin
Filed Sept. 28, 1967, Ser. No. 671,395
Int. Cl. H03k 19/20
U.S. Cl. 307—210                                7 Claims

ABSTRACT OF THE DISCLOSURE

A circuit for the detection of the presence and polarity of orthogonal sine and cosine pulses superimposed on one another, which circuit has two electronic integrators with the output signal of one indicating the presence and polarity of a cosine pulse of a preselected frequency and the output signal of the second integrator indicating the presence and polarity of a sine pulse of the same preselected frequency. An output signal of each integrator is fed to the input of the other, and one of the integrators also has an input that receives the superimposed sine and cosine pulses and combines them with the output signal of the other integrator.

BACKGROUND OF THE INVENTION

Figure 1:
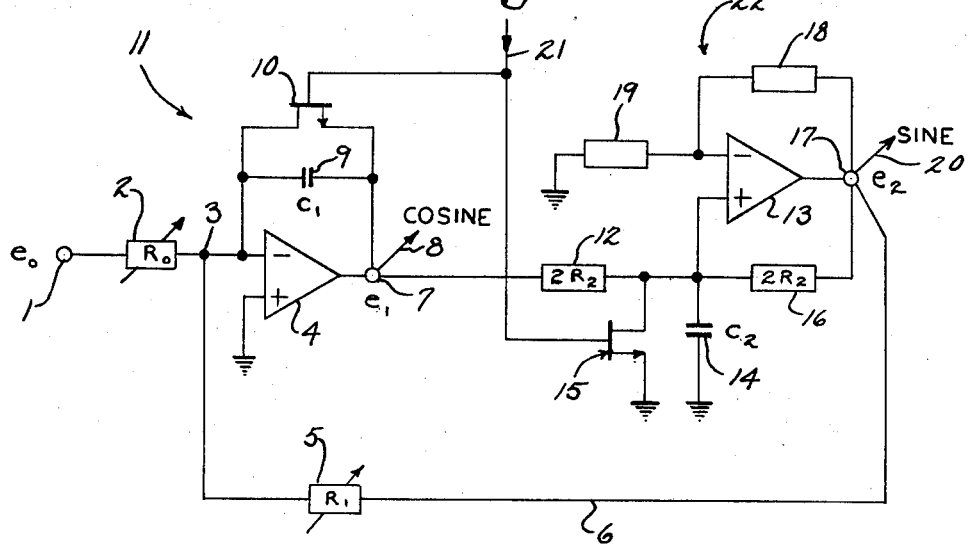

The present invention relates to the detection of intelligence transmitted in the form of orthogonal sine and cosine pulses superimposed on a common transmission medium, or alternatively such pulses may be transmitted sequentially in some programmed manner rather than simultaneously. Such pulses may represent bits of digital information, with each individual sine and cosine pulse indicating one of the two whole binary numbers, and a phase or amplitude reversal of the pulse indicating the other whole binary number. It is the general purpose to detect the presence of each pulse and its phase or amplitude polarity to identify the intelligence transmitted, and to achieve this detection without interference from the other pulses also present. The circuit of the invention is proposed as a means of achieveing this purpose in a superior manner.

In a set of orthogonal sine and cosine functions, the functions of different frequencies are harmonically related to one another and the functions of the same frequency are displaced by 90°, or odd multiples thereof, from one another. Thus, orthogonal sine and cosine functions are of the relation ±sin 2π (nf)t and ±cos 2π (nf)t in which n is a whole integer. For the simultaneous transmission of several items of intelligence a sine or cosine function is transmitted for each item, and the several functions are superimposed as a complex signal representing a set of intelligence. The set of intelligence is transmitted in a brief pulse, or signalling interval, which is designated herein as an orthogonality interval. The duration of the interval is usually the time for one cycle of the lowest frequency transmitted, and a succession of orthogonality intervals immediately follow one another, so that a continuous train of sets of intelligence is transmitted. Orthogonal sine and cosine functions are ideally suited for the transmission of bits of digital information, for the presence of a function in its positive amplitude, i.e. +sin 2π (nf)t or +cos 2π (nf)t may indicate one whole number of the binary scale and the presence of the function in its negative amplitude, i.e. −sin 2π (nf)t or −cos 2π (nf)t, which may also be called a phase or amplitude reversal, then indicates the other whole number of the binary scale. Also, an absence of a function during an orthogonality interval may be employed to indicate the other whole number.

The transmission of orthogonal sine and cosine pulses for conveying intelligence has heretofore been suggested, and designs have been made for both transmitting and receiving equipment. The means of detection at the receiving station has, however, presented a particular problem, with one satisfactory solution recently being described in our copending application Ser. No. 645,447 filed June 12, 1967 and entitled Circuit for Detection of Sine and Cosine Pulses. The present application makes further improvements that overcome difficulties in prior detection systems, such systems and their deficiencies being briefly reviewed in said copending application.

SUMMARY OF THE INVENTION

The invention relates to a detector circuit for sensing both the presence and the phase, or amplitude, of orthogonal sine and cosine functions transmitted in short pulses, and it more specifically resides in a circuit having a pair of electronic integrators that each have an operational amplifier with an integration capacitor connected thereto that develops an output signal proportional to the time integral of the input signal, such integrators being connected with an output signal of each being fed to the input of the other, and one having an additional input to receive the sine and cosine functions to be detected.

A plurality of such detector circuits are employed to detect orthogonal sine and cosine functions of different frequencies, one circuit for each frequency. Such detector circuits combine resistor and capacitor elements with high gain operational amplifiers, as commonly employed in computer circuit technology, and they are low loss circuits having high degrees of resolution. They are also operable over a wide spectrum of frequencies, so that a number of thed etector circuits can be connected as a bank to a receiving medium to detect a multiplicity of orthogonal sine and cosine pulses that also extend over a wide frequency range.

Particular objectives of the present invention are to provide compact circuits of minimal individual components, to simplify detection circuits to make them more reliable, and to reduce the cost of detection apparatus. An additional specific objective is to tie one side of the integration capacitor of one of the electronic integrators directly to ground to stabilize the output signal, and a still further objective is to reduce any possibility of self-oscillation occurring in the circuit due to switching transients.

THE DRAWINGS

Figure 2:
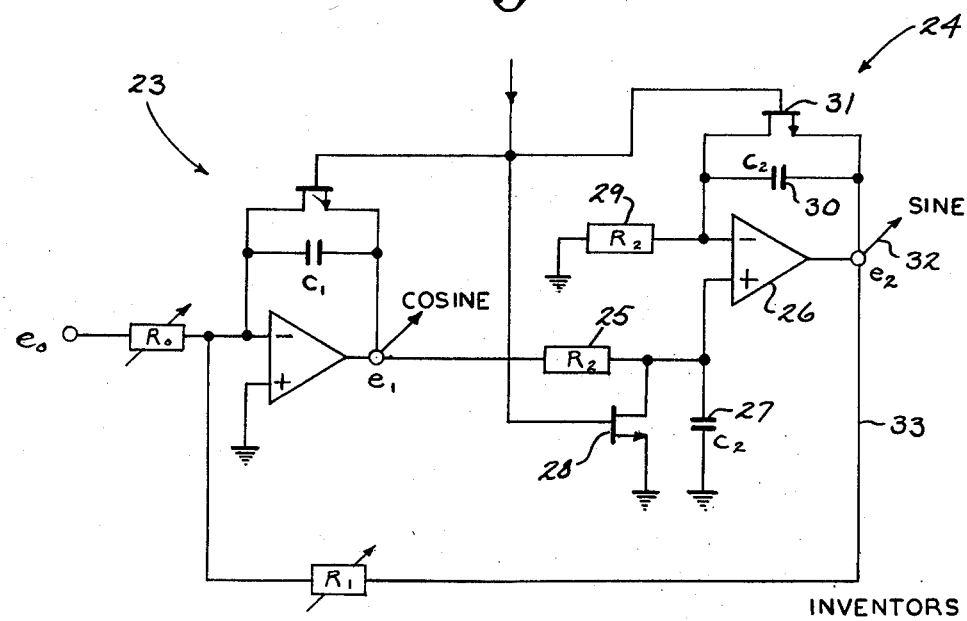
Figure 6:
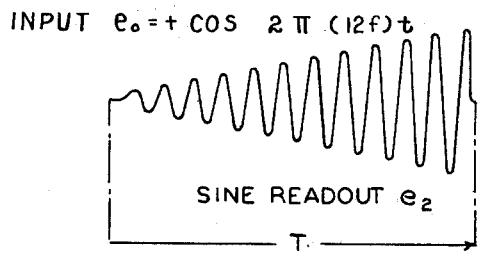
Figure 7:
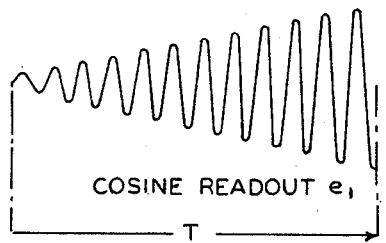
Figure 8:
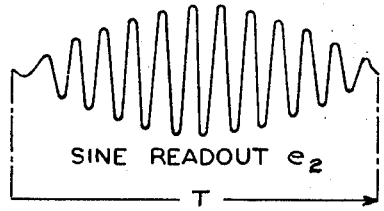
Figure 9:
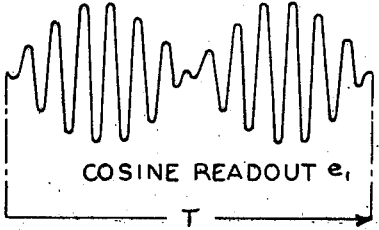

FIG. 1 is a schematic wiring diagram of a circuit for detecting orthogonal sine and cosine pulses which embodies the present invention, FIG. 2 is a schematic wiring diagram of an alternative embodiment of the invention in which the circuit of the second electronic integrator differs from that of the corresponding electronic integrator of FIG. 1, FIG. 3 is a schematic wiring diagram of still another embodiment of the invention in which the input signal is fed to the second electronic integrator, FIG. 4 is a wave form of the sine readout signal of the circuit of FIG. 1 during an orthogonality interval for signal of +sin 2π (12f)t and with the circuit being tuned to the frequency 12f, FIG. 5 is a wave form of the cosine readout signal of the circuit of FIG. 1 during an orthogonality interval for the same input signal as for FIG. 4 and for the same condition of tuning, FIG. 6 is a wave form of the sine readout signal during an orthogonality interval for an input signal of +cos 2π(12f) and the circuit again being tuned to the frequency 12f, FIG. 7 is a wave form of the cosine readout signal during an orthogonality interval for an input signal the same as for FIG. 6 and for the same condition of tuning, FIG. 8 is a wave form of the sine readout signal during an orthogonality interval for an input signal of $+\sin 2\pi(13f)t$ and with the circuit again tuned to the frequency $12f$, and FIG. 9 is a wave form of the cosine readout signal during an orthogonality interval for an input signal of $+\sin 2\pi(14f)t$ and with the circuit tuned to the frequency $12f$.

DESCRIPTION OF EMBODIMENTS

Referring first to FIG. 1, there is shown a preferred embodiment of a circuit that performs the operation of detecting both the presence and the phase, or amplitude, of orthogonal sine and cosine pulses of the same frequency. A similar circuit would be employed for each frequency of sine and cosine pulses transmitted in a complex pulse of superimposed orthogonal functions, so that a bank of like circuits would be utilized in the detection of a set of intelligence being transmitted and received. The input terminals of each of such detection circuits would be connected to a common incoming transmission medium, and in the circuit of FIG. 1 its input terminal that receives a voltage input signal $e_0$ is designated by the numeral 1. The input terminal 1 is connected to a variable amplitude controlling resistor 2 (also designated $R_0$ for the purpose of stating equations hereinafter, and similarly some of the other circuit components are identified by letter as well as numeral for facilitating the writing of circuit equations) which leads to a summing point 3 and then to the inverting, negative input of an operational amplifier 4. The summing point 3 is also connected to a variable tuning resistor 5 which is in a feedback line 6. The output of the operational amplifier 4 connects with a junction point 7 at which a voltage $e_1$ appears, such voltage being indicative of the presence and phase, or amplitude, of a cosine pulse in the input signal voltage $e_0$ of the frequency to be detected by the circuit. An output lead 8, conveniently termed a cosine readout lead, is attached to the point 7 to deliver an output signal from the circuit.

Across the operational amplifier 4 is an integration capacitor 9 that has a connection on one side with the junction point 7 and a connection on its other side with the inverting, negative input of the amplifier 4. A field effect transistor 10 bridges across the integration capacitor 9 to serve as a shorting or clearing switch for discharging the capacitor 9 at the end of each orthogonality interval, and the operational amplifier 4 together with the capacitor 9, transistor 10 and the variable resistors 2 and 5 form a first electronic integrator 11 that is connected in the polarity inverting mode.

The junction point 7 is connected to an input resistor 12 that leads to the non-inverting positive input terminal of an operational amplifier 13. The input resistor 12 and the positive input terminal of the amplifier 13 also have a common connection with an integration capacitor 14 and one side of a field effect transistor 15. Both the capacitor 14 and the transistor 15 are grounded at one side so that the field effect transistor 15 bridges across the integration capacitor 14 to act as a shorting, or clearing switch for discharging the capacitor 14 at the end of an orthogonality interval, similarly as the transistor 10 functions as a clearing switch for the capacitor 9.

A first feedback resistor 16 is connected between the positive input terminal of the operational amplifier 13 and a junction point 17 that is connected to the output of the operational amplifier 13. A second feedback resistor 18 is connected between the junction point 17 and the amplifier negative input terminal, and another feedback resistor 19 is connected between the amplifier negative input terminal and ground. The feedback line 6 which is connected to variable tuning resistor 5 is also connected to the junction point 17.

A voltage $e_2$ appears at the point 17 that is indicative of the presence and phase, or amplitude, of a sine pulse in the input signal voltage $e_0$ of the frequency to be detected by the circuit, and an output lead 20, conveniently termed a sine readout lead, is joined to the junction point 17 to deliver a second output signal from the circuit. To complete the circuit there is a control lead 21 for the field effect transistors 10 and 15 through which control pulses are transmitted to the circuit for causing the transistors 10 and 15 to conduct and discharge their respective associated integration capacitors 9 and 14 at the end of each orthogonality interval.

The operational amplifier 13 together with the resistors 12, 16, 18 and 19, the integration capacitor 14 and the electronic switch afforded by the field effect transistor 15 form a second electronic integrator circuit 22. It is seen that the output voltage signal $e_2$ of the electronic integrator circuit 22 is fed through the feedback line 6 to the input of the electronic integrator circuit 11, and that the output of the integrator circuit 11 is in turn connected to the input of the electronic integrator circuit 22, whereby the apparatus comprises two electronic integrators connected in a loop with one of the electronic integrators, 11, also receiving an input signal voltage $e_0$ that drives the circuit in its operation.

An analysis of the circuit operation can be made by reference to FIGS. 4–9. Assume that the circuit of FIG. 1 is adjusted to detect pulses of a frequency of the 12th harmonic, that is $\pm\sin 2\pi(12f)t$ and $\pm\cos 2\pi(12f)t$, and further assume that an input signal voltage $e_0$ for an orthogonality interval T consists solely of the pulse $+\sin 2\pi(12f)t$. At the commencement of the orthogonality interval for which detection is to be made the integration capacitors 9 and 14 are discharged and the electronic switches afforded by the field effect transistors 10 and 15 are open, so that the capacitors 9 and 14 can develop a charge during the orthogonality interval. The incoming signal voltage $e_0$ fed through the variable amplitude resistor 2 is summed with a feedback voltage through the resistor 5 from the voltage $e_2$, and the summation is fed to the inverting terminal of the operational amplifier 4. The integration capacitor 9 will develop a continuously varying voltage proportional to the time integral of the summed input voltage, and this presents the output $e_1$ at the junction point 7. This voltage output signal appears in FIG. 5, and it is seen that it has an increasing envelope. Further, at the termination of the orthogonality interval T the instantaneous voltage value is zero, and such zero value indicates the absence of a cosine pulse in the input signal voltage $e_0$ of the frequency for which the circuit of FIG. 1 is to make a detection.

The output $e_1$ of the electronic integrator 11, appearing at junction point 7, is continuously fed to the electronic integrator 22 in which the integration capacitor 14 develops a charge which yields an output proportional to the time interval of the input to the integrator 22. The output voltage $e_2$ at the junction point 17 rides with the charge of the integration capacitor 14, and the wave form of this output is shown in FIG. 4. It is seen that the output voltage $e_2$ has an increasing envelope and that at the termination of the orthogonality interval T the instantaneous value at the junction point 17, and consequently for the sine readout lead 20, is at a maximum positive value. This maximum positive value is an indication of the presence of a sine pulse of positive amplitude in the input voltage signal $e_0$ of the frequency to be detected by the circuit. If the input voltage signal had been phase or polarity reversed, i.e. $-\sin 2\pi(12f)t$ then the instantaneous value at the sine readout lead 20 at the termination of the orthogonality interval would have been a maximum negative value, wherefore the polarity at the sine readout lead 20 corresponds to that of the sine pulse in the voltage $e_0$ that is being detected.

Now assume that the voltage input signal $e_0$ at the terminal 1 comprises solely the pulse $+\cos 2\pi(12f)t$. For this condition the output signal $e_2$ at the sine readout lead 20 over an orthogonality interval T, is given in FIG. 6, and the output signal $e_1$ at the cosine readout lead 8 is given in FIG. 7. It is seen that at the end of an orthogonality interval the cosine readout lead 8 has a maximum negative value. This maximum value indicates the presence of the cosine function to be detected by the circuit of FIG. 1, and due to the inverting mode of the electronic integrator 11 the output signal at the cosine readout has an opposite polarity from that of the input signal.

Referring to FIG. 6, it is observed that at the end of the orthogonality interval the instantaneous signal voltage $e_2$ at the sine readout lead 20 is zero, thus indicating the absence of the sine function to be detected by the circuit of FIG. 1. If the input voltage signal had been $-\cos 2\pi(12f)t$, then the instantaneous voltage value at the sine readout lead 20 would again be zero, and at the cosine readout lead 8 the instantaneous signal voltage would be a positive maximum value.

The foregoing reference to FIGS. 4 through 7 indicates the response of the circuit of FIG. 1 to sine and cosine pulses for which the circuit is to make a detection. Reference is now made to FIGS. 8 and 9 to indicate the operation of the circuit with respect to orthogonal sine and cosine pulses at frequecies that are not to be detected by the circuit. Assume that the input voltage signal $e_0$ in an orthogonality interval T consists solely of the function $+\sin 2\pi(13f)t$, which is one harmonic removed from frequency of detection for which the circuit is adjusted. The harmonic beat frequency between the frequency of adjustment $12f$ and the frequency of the input signal $13f$ is therefore one, and in FIG. 8 there is shown the voltage $e_2$ at thsine readout lead 20 during the orthogonality interval. It is observed that the envelope rises and falls once, in correspondence to the beat frequency, and that at the end of the orthogonality interval the instantaneous voltage at the sine readout lead 20 is zero. A like condition also occurs at the cosine readout lead 8, wherefore orthogonal sine and cosine pulses of a frequency other than that for which the circuit of FIG. 1 is adjusted will present instantaneous values of zero at the end of the orthogonality interval. Thus, the circuit the invention will reject these harmonically related signals by having a zero component in the voltage signals $e_1$ and $e_2$ at the readout leads 8 and 20 at the end of the orthogonality interval.

A further example of the reaction of the circuit of FIG. 1 to othrogonal sine and cosine pulses at frequencies other than that for which the circuit is adjusted for detection is presented in FIG. 9. For FIG. 9 the input voltage $e_0$ at the input terminal 1 consisted solely of the sine function $+\sin 2\pi(14f)t$. This frequency is two harmonics removed from that for which the circuit of FIG. 1 is adjusted for detection so that the harmonic beat frequency is also two. FIG. 9 shows the voltage $e_1$ during an orthogonality interval T at the cosine readout lead 8, and at the end of the interval T the instantaneous value is zero, as had been the case for the frequency $13f$. The envelope in FIG. 9 increased to a maximum and ecreased to zero twice during the orthogonality interval, this rise and decrease corresponding to the harmonic beat frequency of two. Similar wave forms are had for the frequency $14f$ at the sine readout lead 20, so that again for an orthogonal sine or cosine pulse of a frequency different than that for which the circuit is adjusted to make a detection, the component of the signal output voltage is zero at the end of the orthogonality interval. Hence, the circuit of FIG. 1 will detect, with a high degree of resolution, the presence and polarity of sine and cosine pulses of a particular frequency which comprise a part of a complex signal input of numerous orthogonally related sine and cosine functions.

At the end of an orthogonality interval the field effect transistors 10 and 15 are pulsed through the control lead 21 to discharge and reset the integration capacitors 9 and 14. Also, the voltage values $e_1$ and $e_2$ at the cosine and sine readout leads 8 and 20 are delivered at the end of the interval to appropriate hold circuits adapted to receive the intelligence detected by the circuit of FIG. 1. Such circuits for receiving the output signals and synchronizing the transistors 10 and 15 are not a part of the invention, and one example of an arrangement for these supplementary circuits is shown in said copending application.

The relationship between components and voltages of the circuit of FIG. 1 can be expressed mathematically by the following differential equations (in which the components are identified by the letter designations shown in the drawing):

$$e_1 = R_2 C_2 \dot{e}_2$$

$$R_1 C_1 R_2 C_2 \ddot{e}_2 + e_2 = -\frac{R_1}{R_0} e_0$$

These equations neglect circuit losses due to power dissipation in the capacitors, finite gain of the operational amplifiers, and finite, input impedances of the operational amplifiers. The circuit has a time constant that is expressed by the relationship $$\tau = \sqrt{R_1 C_1 R_2 C_2}.$$

This is an indication of the speed of response of the circuit, and also of the frequency for which it will detect sine and cosine pulses. This frequency of detection is given by the relation $$f = \frac{1}{2\pi\tau}$$

and by selection of the proper resistance and capacitance elements the circuit is made to detect a desired frequency. When a bank of circuits are to detect a set of sine and cosine pulses, it is obvious each circuit has its particular resistance and capacitance values in accordane with the foregoing relationships. Final tuning of the circuit of FIG. 1 is obtained by variation of the resistor $R_1$, or 5, and the amplitude of the readout voltages $e_1$ and $e_2$ is controlled by variation of the resistor $R_0$, or 2.

By the foregoing relationship for the frequency of detection the circuit is tuned to such frequency. Continued energy input at this frequency during an orthogonality interval creates an increasing energy storage, thus developing the increasing envelopes of FIGS. 4–7, while at other frequencies such energy storage is not progressive, as indicated by FIGS. 8 and 9, so that for orthogonal functions the energy decay to minimal value corresponds with the end of an orthogonality interval.

Some additional relationships between the resistors of the electronic integrator 22 are also desirable for achieving satisfactory integration in this integrator. The gain of the operational amplifier should equal the value of two, and for this the resistors 18 and 19 should be of equal value. Further, resistors 12 and 16 should be equal to one another for proper integration.

Referring now to FIG. 2, there is shown an embodiment in which a first electronic integrator 23 has the same arrangement of components as the integrator 11 of FIG. 1, but a second integrator 24 illustrates another manner for obtaining a non-inverting second integrator giving a sine readout signal. This second integrator has an input resistor 25 joined at its left hand side to the output of the integrator 23 and at its right hand side to both the non-inverting, positive input terminal of an operational amplifier 26 and one side of a first integration capacitor 27. The opposite side of the capacitor 27 is grounded, and across the capacitor 27 is a field effect transistor 28 that acts as an electronic switch. The negative input terminal of the amplifier 26 is joined through a resistor 29 to ground, and a second integration capacitor 30, that is bridged by a second switching transistor 31, is connected across the negative input and the output of the amplifier 26. A sine readout lead 32 and a feedback lead 33 are also connected to the amplifier output. In the second integrator circuit 24 there must be a close matching of the time constant of the resistor 25 and capacitor 27 with the time constant of the resistor 29 and capacitor 30, and also the dual switching of transistors 28 and 31 must be adequately synchronized. In FIG. 2 the resistors and capacitors have been identified by letter, so as to have the foregoing circuit equations applicable thereto.

FIG. 3 shows an embodiment in which the input signal voltage $e_0$ is fed into the second, non-inverting integrator, rather than the first inverting integrator. The input terminal is designated by the numeral 34, and it connects through an input resistor 35 to the positive input terminal of an operational amplifier 36. The remaining components in FIG. 3 are arranged like those of FIG. 1, so that designation by reference numeral of all the components is not necessary, although letter designations have been applied for use in applying the circuit equations of the following paragraph. Of these components, input resistor 37 and feedback resistor 38 should both be of the same value as input resistor 35, and for this matching of resistors the input source impedance should be taken into effect, so that this circuit is not as desirable as that of FIG. 1. Also, feedback resistor 39 should be twice the value of feedback resistor 40 to produce a gain of three for the amplifier circuit. Another aspect making the circuit of FIG. 1 the desired embodiment, is that amplitude tuning for FIG. 3 is not accomplished by variation of the input resistor 35. For such tuning the value of $e_0$ must be adjusted before being applied to the input terminal 34.

A variation in FIG. 3 from the embodiments of FIGS. 1 and 2 is that the output signal indicative of a cosine component during an orthogonality interval appears at the voltage $e_2$ and the signal indicative of a sine component appears at the voltage $e_1$. Also, the differential equations for the circuit of FIG. 3 become the following:

$$R_1C_1R_2C_2\ddot{e}_1 + e_1 = -e_0$$

$$e_2 = R_1C_1\dot{e}_1$$

The invention may be practiced in several embodiments, and the illustrations herein are not to be construed as limiting the scope of the invention, but rather reference is made to the claims appended hereto.

We claim:
1. In a detection circuit for detecting orthogonal sine and cosine pulses occurring during an orthogonality interval the combination comprising:
   a first amplifier connected with an input in the phase inverting mode;
   an integration capacitor across the output and input of the amplifier;
   a switch element bridging said capacitor and discharging the same after an orthogonality interval;
   a cosine readout at the output of the amplifier;
   a second amplifier connected with the input fed from the first amplifier output and in the non-inverting mode;
   a second integration capacitor connected to the second amplifier;
   a second switch element bridging said second capacitor and discharging the same after an orthogonality interval;
   a sine readout at the output of said second amplifier;
   a connection between the output of the second amplifier and the input of the first; and
   a circuit input for feeding orthogonal sine and cosine pulses to the circuit in orthogonality intervals.
2. A circuit as in claim 1, wherein the second amplifier is connected with feedback resistors for a gain two.
3. A circuit as in claim 1 wherein the circuit input is joined to the input of the first amplifier.
4. A circuit as in claim 1 wherein the circuit input is joined to the input of the second amplifier, and such amplifier is connected with feedback resistors for a gain of three.
5. In a detecting circuit for sensing the presence of orthogonal sine and cosine pulses the combination comprising:
   a pair of electronic integrator circuits connected in a loop circuit with an output of each fed to the input of the other;
   a first of the pair of integrator circuits having an amplifier with an input connected to the inverting terminal thereof, an integration capacitor across the input and the output of the amplifier, a switching element bridging the integration capacitor, and a readout at the output;
   the second of the pair of integrator circuits having an amplifier with an input joined to the non-inverting terminal of the amplifier and fed from the output of the first integrator circuit, a feedback resistor across the output of the amplifier and the inverting terminal, a second feedback resistor across the output of the amplifier and the non-inverting terminal, an integration capacitor between the amplifier non-inverting terminal and ground, a switching element across the integration capacitor, a feedback line from the amplifier output to the input of the first integrator circuit, and a sine readout at the amplifier output; and
   a circuit input terminal for the circuit to receive orthogonally related sine and cosine functions that is joined to the input of one of the integrator circuits.
6. In a detecting circuit for sensing the presence of orthogonal sine and cosine pulses received in orthogonality intervals the combination comprising:
   a pair of electronic integrator circuits connected in a loop circuit with an output of each fed to the input of the other;
   a first of the pair of integrator circuits having an operational amplifier and an integration capacitor connected to the amplifier, a switching element bridging the integration capacitor for discharging the capacitor at the end of an orthogonality interval, and a readout lead for delivering an output signal at the end of an interval;
   the second of the pair of integrator circuits having an operational amplifier and an integration capacitor connected to the amplifier, a switching element bridging the integration capacitor for discharging the capacitor at the end of an orthogonality interval, and a readout lead for delivering an output signal at the end of an interval; and
   a circuit input to feed orthogonally related sine and cosin pulses to the circuit.
7. A circuit as in claim 6 wherein the circuit is tuned to one frequency of sine and cosine pulses by the relationship of the frequency being of the value of one divided by $2\pi$ times the circuit time constant.

References Cited

UNITED STATES PATENTS

| 3,013,160 | 12/1961 | Reiner | 328—127 XR |
| 3,333,092 | 7/1967 | Hauser | 238—183 |
| 3,369,185 | 2/1968 | Carter | 329—50 |
| 3,268,824 | 8/1966 | Hinrichs et al. | 328—127 |

DONALD D. FORRER, Primary Examiner

H. A. DIXON, Assistant Examiner

U.S. Cl. X.R.

328—127, 140, 167